United States Patent [19]
Jaramillo et al.

[11] Patent Number: 6,016,528
[45] Date of Patent: Jan. 18, 2000

[54] PRIORITY ARBITRATION SYSTEM PROVIDING LOW LATENCY AND GUARANTEED ACCESS FOR DEVICES

[75] Inventors: Ken Jaramillo; David Gerard Spaniol, both of Phoenix, Ariz.

[73] Assignee: VlSI Technology, Inc., San Jose, Calif.

[21] Appl. No.: 08/960,184

[22] Filed: Oct. 29, 1997

[51] Int. Cl.[7] .................................................. G06F 13/14
[52] U.S. Cl. ......................... 710/243; 710/244; 710/107; 710/240
[58] Field of Search .................................... 395/732, 800, 395/800.34, 325, 725; 710/107, 123, 241, 242, 243, 244, 240

[56] References Cited

U.S. PATENT DOCUMENTS

| | | | |
|---|---|---|---|
| 5,392,436 | 2/1995 | Jansen et al. | 395/725 |
| 5,396,602 | 3/1995 | Amini et al. | 395/325 |
| 5,619,720 | 4/1997 | Garde et al. | 395/800 |
| 5,805,905 | 9/1998 | Biswas et al. | 395/732 |
| 5,822,768 | 10/1998 | Shakkarwar | 711/149 |
| 5,826,101 | 10/1998 | Beck et al. | 395/800.34 |

*Primary Examiner*—Ayaz R. Sheikh
*Assistant Examiner*—Tim Vo
*Attorney, Agent, or Firm*—Wagner, Murabito & Hao LLP

[57] ABSTRACT

The present invention comprises a priority arbitration system for interfacing a plurality of PCI agents coupled to a peripheral component interconnect (PCI) bus such that high priority PCI agents are satisfied without starving low priority PCI agents. The system of the present includes a PCI bus adapted to transmit data signals. At least one high priority PCI agent is coupled to the PCI bus. At least one low priority PCI agent is coupled to the PCI bus. An arbiter is coupled to the high priority PCI agent and the low priority PCI agent via the PCI bus. The arbiter grants ownership of the PCI bus to the high priority PCI agent prior to granting ownership to the low priority PCI agent. After being granted ownership, the high priority PCI agent becomes an interim low priority PCI agent. The low priority PCI agent is accorded a higher priority by the arbiter than the interim low priority PCI agent. The interim low priority PCI agent reverts to the high priority PCI agent subsequent to a grant to the low priority PCI agent. In this manner, the arbiter, by granting ownership of the PCI bus to the low priority PCI agent before granting ownership of the PCI bus to the interim low priority PCI agent, ensures the low priority PCI agent is not prevented from accessing the PCI bus by the high priority PCI agent.

18 Claims, 5 Drawing Sheets

PRIORITY ARBITRATION SYSTEM PROVIDING LOW LATENCY AND GUARANTEED ACCESS FOR DEVICES

TECHNICAL FIELD

The present invention pertains to the field of arbitration systems for computer system bus architectures. More particularly, the present invention relates to fixed priority arbitration system for providing low bus latency for critical devices and guaranteed access for non-critical devices.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user and to efficiently execute its assigned tasks. With many peripheral devices, such as graphics adapters, full motion video adapters, small computer systems interface (SCSI) host bus adapters, and the like, it is imperative that large block data transfers be accomplished expeditiously for efficient execution. These devices are just some examples of subsystems which benefit substantially from a very fast bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to execute a data transaction, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transaction (e.g., transfer a file).

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents, determining which requesting PCI agent is granted PCI bus ownership. When one of PCI agents 114–124 is granted PCI bus ownership, it initiates its transaction (e.g., file transfer) with a "target" or slave device (e.g., main memory 104). When the data transaction is complete, the PCI agent relinquishes ownership of PCI bus 112, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols. These protocols are designed to standardize the method of accessing, utilizing, and relinquishing PCI bus 112, so as to maximize its data transfer bandwidth while ensuring interoperability among various PCI bus devices from various manufacturers. The PCI bus protocols and specifications are set forth in an industry standard PCI specification (e.g., PCI Specification—Revision 2.1). Where each of PCI agents 114–124 are high performance, well designed devices, data transfer rates approaching 528 Mbytes per second can be achieved (e.g., a 64 bit PCI bus 112 operating at 66 MHz).

Sustaining consistently high data transfer rates across a PCI bus requires efficient allocation of PCI bus ownership, and thus, PCI bus bandwidth. Each device needs ownership of the PCI bus in accordance with its respective requirements. These requirements include, for example, latency tolerance, data transfer bandwidth, block transfer size, and the like. Some devices are more critical to the proper operation of the computer system than others. Some devices are less tolerant of latency than others. In addition, some devices need to transfer very large quantities of data. Hence, devices coupled to the PCI bus are of differing priority with regard to their respective requests for PCI bus ownership.

Efficiently managing the allocation of the PCI bus is essential to the proper operation of a computer system. Efficient allocation management assumes even greater importance when devices of differing priority require ownership of the PCI bus. As described above, only one device at a time can transfer data across the PCI bus. Consequently, competing devices arbitrate for ownership and the arbiter determines which device is granted the PCI bus. Afterwards, the remaining devices subsequently are forced to wait and continue arbitration. Some devices are more important to the functionality of the computer system than other devices and are thus considered high priority. Some devices are more tolerant of latency than other devices and are accordingly considered lower priority. The arbiter needs to ensure the bus is allocated among the competing devices, taking into account their relative priorities. To accomplish this, the arbiter follows a predetermined arbitration methodology, or arbitration scheme.

Prior Art FIG. 2 shows a typical prior art prioritized arbitration scheme 200. Arbitration scheme 200 shows the relative priority of 7 coupled devices, device 0 through device 6, where device 0 is the highest priority device and device 6 is the lowest priority device. Higher priority devices are allocated the higher priority positions in arbitration scheme 200 (e.g., device 0) while lower priority devices are allocated lower priority positions (e.g., device 6). For example, a network adapter card typically is required to transfer very large blocks of data from the network to main memory, which requires a disproportionately large amount of PCI bus data transfer bandwidth. The network adapter also typically has internal buffers of limited size, which cannot tolerate data transfer latency without incurring a buffer overrun or underrun. Consequently, the network adapter would be coupled as device 0. In contrast, a printer does not transfer particularly large blocks of data, is very tolerant of latency, and is thus coupled as device 6. In this manner, peripheral devices are coupled to the PCI bus and are granted ownership of the PCI bus according to their respective priorities. Hence, where all of devices 0 through 6 simultaneously request ownership, device 0 receives ownership first.

There is a problem, however, in that arbitration scheme 200 does not adequately match the differing requirements of bandwidth and priority of different devices. In arbitration scheme 200, where there are many high bandwidth devices using the PCI bus and where each issues successive requests for ownership, lower priority devices can be prevented from acquiring ownership for long periods of time, or "starved" of PCI bus bandwidth. Arbitration scheme 200 does not ensure low priority devices are not prevented from acquiring ownership.

For example, at any time device 6 and any other device request ownership, device 6 "loses" the arbitration and is required to wait for a successive arbitration following the resulting data transaction. Where there are numerous requests for access from other devices, each one of which is of a higher priority than device 6, there may be very prolonged periods of time during which device 6 never aquires ownership. To ensure proper operation of the computer system, higher priority devices, which typically require large amounts of data transfer bandwidth, occupy the higher priority positions. While this assists the higher priority devices in receiving their required data transfer bandwidth, low priority devices can be easily starved.

Thus, what is required is an arbitration scheme which is much more flexible with regard to allocating PCI bus bandwidth. The required solution needs to ensure low priority devices are not starved while ensuring high priority devices are adequately served. The required system needs to efficiently allocate PCI bus bandwidth to maximize the overall functionality of a computer system. The present invention provides a novel solution to the above requirements.

DISCLOSURE OF THE INVENTION

The present invention provides a method and system of priority arbitration which provides predictable latency and guaranteed access for devices coupled to a PCI bus. The present invention provides an arbitration scheme which is much more flexible with regard to allocating PCI bus bandwidth. The present invention ensures low priority devices are not starved while ensuring high priority devices are adequately served. The present invention efficiently allocates PCI bus bandwidth to maximize the overall functionality of a computer system.

In one embodiment, the present invention comprises a priority arbitration system for interfacing a plurality of PCI agents coupled to PCI bus such that high priority PCI agents are satisfied without starving low priority PCI agents. The system of the present includes a PCI bus adapted to transmit data signals, at least one high priority PCI agent coupled to the PCI bus, and at least one low priority PCI agent coupled to the PCI bus. An arbiter is coupled to the high priority PCI agent and the low priority PCI agent via the PCI bus. In accordance with their respective priority, the arbiter grants ownership of the PCI bus to the high priority PCI agent prior to granting ownership to the low priority PCI agent. However, in the present invention, after being granted ownership, the high priority PCI agent becomes an interim low priority PCI agent.

The low priority PCI agent is accorded a higher priority by the arbiter than the interim low priority PCI agent. Hence, the low priority PCI agent wins any arbitration against the interim low priority PCI agent. This ensures the low priority agent is not starved of bus access. Subsequent to a data transaction by the low priority PCI agent, the interim low priority PCI agent reverts back to the high priority PCI agent, which, once again, wins arbitration against the low priority PCI agent. In this manner, the arbiter, by granting ownership of the PCI bus to the low priority PCI agent before granting ownership of the PCI bus to the interim low priority PCI agent, ensures the low priority PCI agent is not prevented from accessing the PCI bus by the high priority PCI agent. Thus, the present invention efficiently allocates PCI bus bandwidth to maximize the overall functionality of the computer system.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, a priority arbitration system providing a predictable latency and guaranteed access for devices, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a method and system of priority arbitration which provides predictable latency and guaranteed access for devices coupled to a bus. The present invention provides an arbitration process which is much more flexible with regard to allocating bus bandwidth. The present invention ensures low priority devices are not starved while ensuring high priority devices are adequately served. In so doing, the present invention efficiently allocates bus bandwidth to maximize the overall functionality of a computer system. The present invention and its benefits are further described below.

Figure 1:
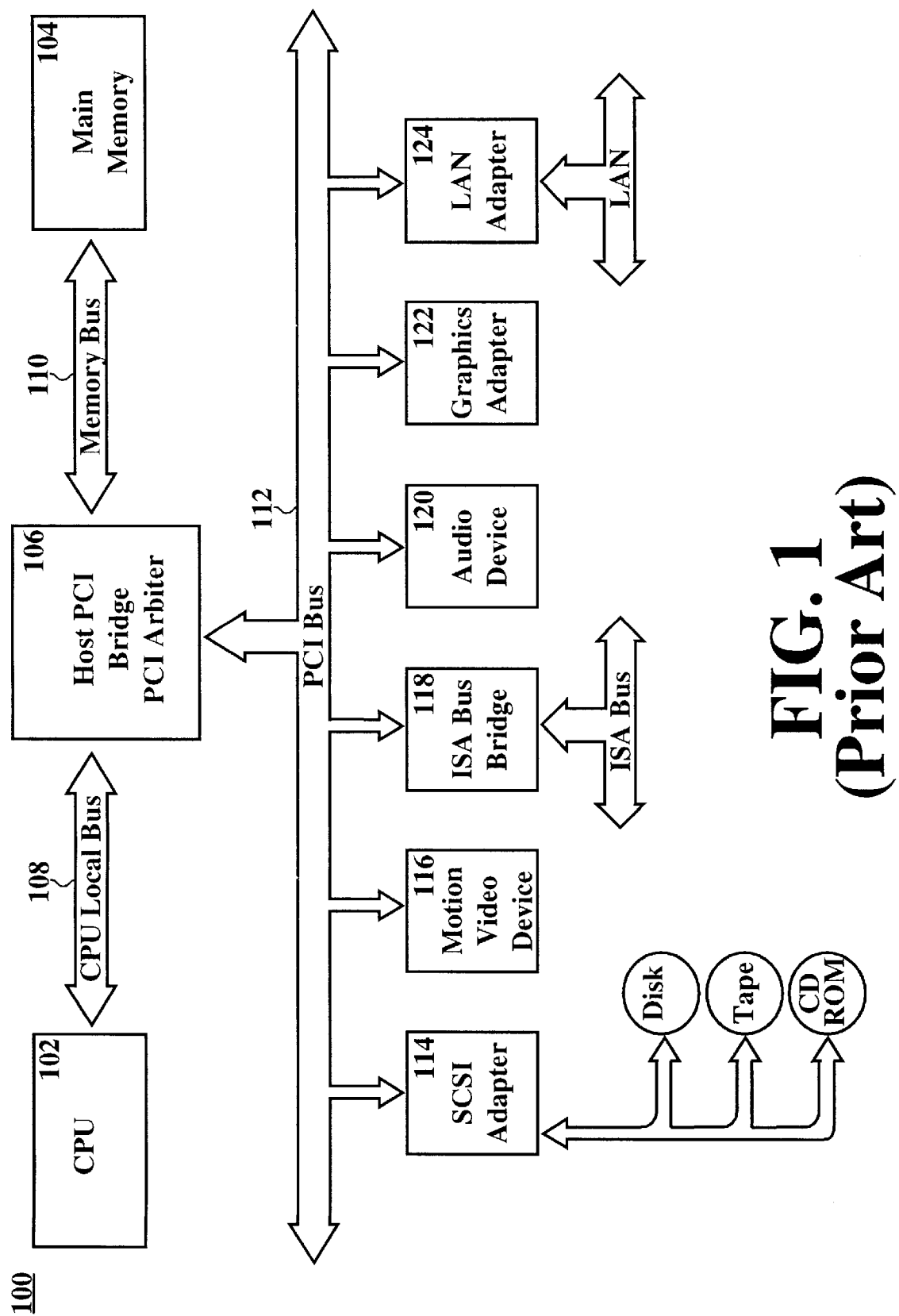
FIG. 1 shows a typical PCI bus architecture of the prior art.
Figure 2:
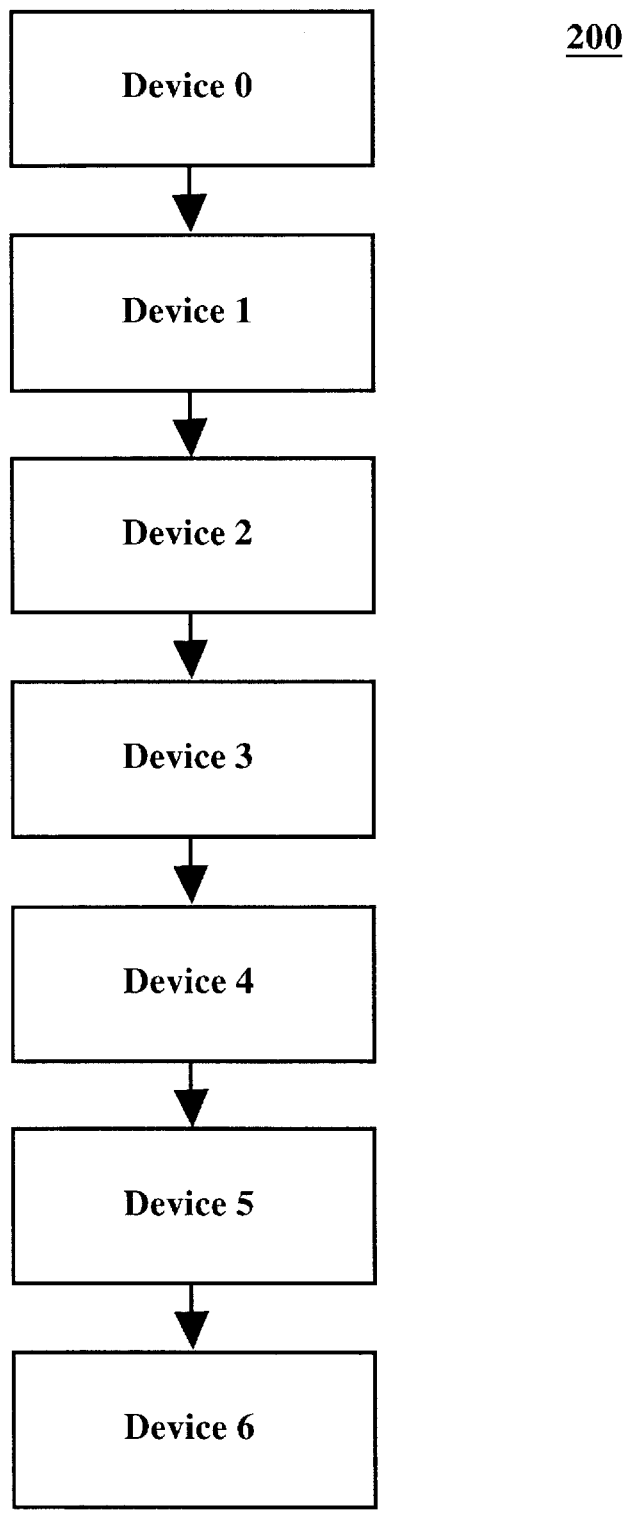
FIG. 2 shows a diagram of a typical prior art prioritized arbitration scheme.
Figure 3:
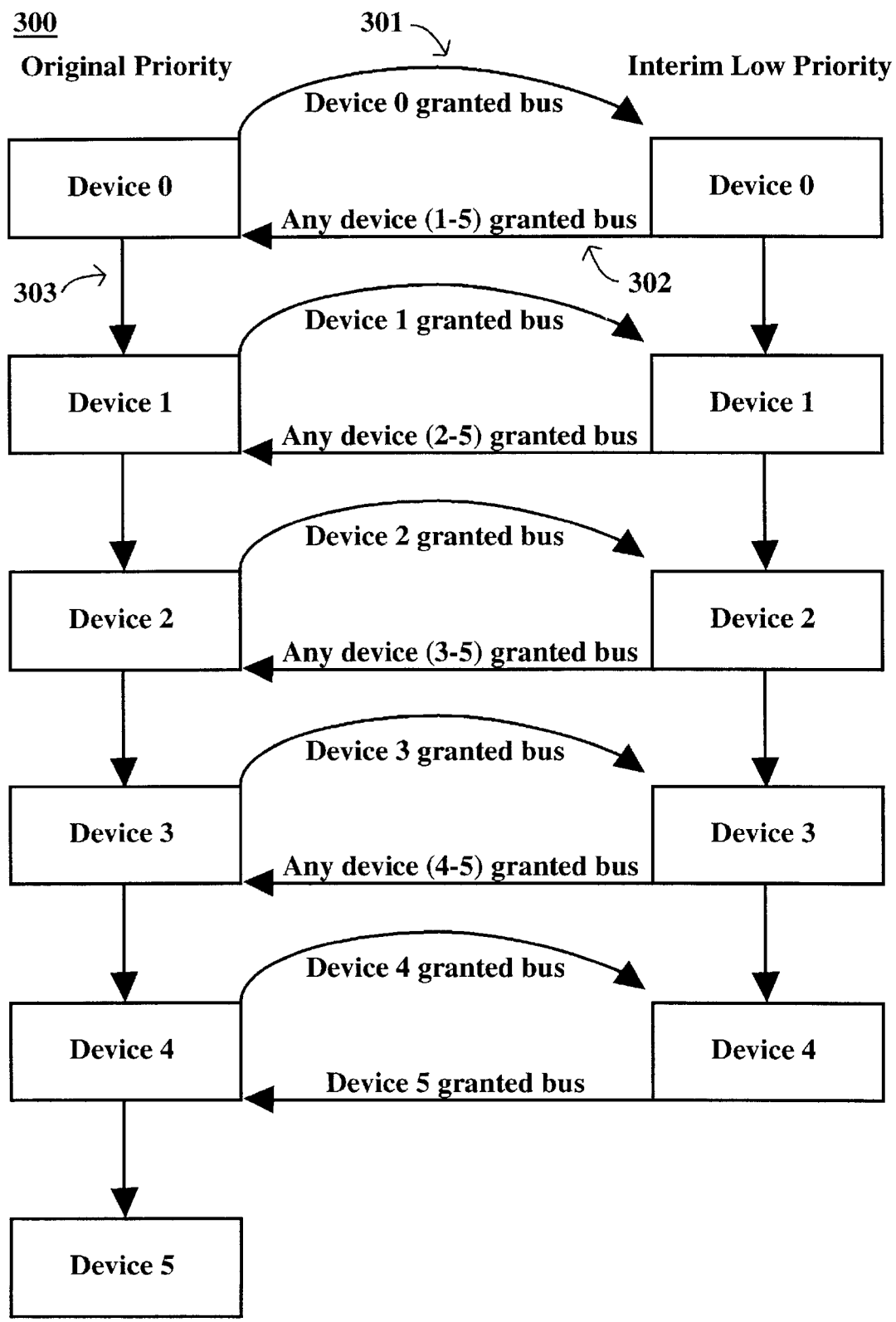
FIG. 3 shows a diagram of a first arbitration process in accordance with one embodiment of the present invention.

Referring to FIG. 3, a diagram of a priority arbitration process 300 in accordance with one embodiment of the present invention is shown. Arbitration process 300 shows the relative priority of 6 coupled devices, device 0 through device 5, arranged in order of priority where device 0 is the highest priority device and device 5 is the lowest priority device. Higher priority devices are allocated higher priority positions in arbitration process 300 (e.g., device 0) and lower priority devices are allocated lower priority positions (e.g., device 5). Arbitration process 300 also shows devices 0–4 in their original priority states (e.g., on the left side) and devices 0–4 in their interim low priority states (e.g., on the right side).

High priority devices are those devices which require large amounts of data transfer bandwidth or are intolerant of latency. Such devices typically include, for example, network adapter cards, graphics accelerator cards, real time video devices, and the like. Low priority devices include, for example, telephone modems, audio cards, printers, and the like, which can function nominally under moderate latency. These devices are coupled to a PCI bus including the system of the present invention such that the highest priority device is coupled as device 0, the next highest priority device is coupled as device 1, and so on, through the lowest priority device being coupled as device 5.

Arbitration process 300 functions by efficiently allocating PCI bus bandwidth (e.g., PCI bus ownership) among devices 0–5 in accordance with their respective priorities. Arbitration process 300, in accordance with the present invention, satisfies the bandwidth and latency requirements of the high priority devices while concurrently ensuring the lower priority devices are not starved. Each of devices 0–5 are assigned a fixed, original priority according to their respective requirements. However, even though an original priority is assigned, the priority is alterable such that successive grants of the PCI bus affect future grants. In other terms, the grants of the PCI bus in a system in accordance with arbitration process 300 are "perceptible" in that successive grants to a high priority device affect subsequent grants to that high priority device.

Subsequent grants are affected through the use of interim priority states. Where a high priority PCI agent (e.g., device 0) requests and is granted the PCI bus, it becomes an interim low priority PCI agent for the next arbitration subsequent to its data transaction. This interim low priority is treated by an arbiter in accordance with the present invention as the lowest priority of the coupled devices (e.g., devices 0–5). The interim low priority PCI agent remains the lowest priority device until a device (e.g., device 1) with a lower original priority is granted the bus. The interim low priority PCI agent then reverts to its state as a high priority PCI agent.

For example, device 0, since it occupies a high priority position in arbitration process 300, will "win" any arbitration with another device (e.g., device 1). In accordance with the present invention, upon being granted the PCI bus, device 0 becomes an interim low priority PCI agent. This is shown by arrow 301. At this time, device 0 has the lowest "effective" priority of devices 0–5. This is shown by device 0 being in the interim priority column as a result of arrow 301. For any subsequent arbitration, any of devices 1-5 (e.g., in the original priority column) will win ownership as against device 0 by virtue of device 0's interim low priority status. In the present embodiment, while in the interim low priority state, device 0 cannot be granted ownership unless there are no other original priority devices requesting ownership. Once one of devices 1–5 is granted ownership, device 0 reverts back to its original priority (e.g., the original priority column). This is shown by arrow 302. Upon reversion to its original priority, device 0 once again wins any arbitration with any of devices 1–5. This is shown by arrow 303.

Thus, in accordance with the present invention, when any of devices 1–4 is granted the PCI bus, that device is given an interim low priority having the lowest effective priority as against all other original priority devices. It cannot be granted the PCI bus unless there are no other lower priority devices (according to the original priority column) requesting ownership. If two devices are in the interim low priority state they are assigned a priority the reverse of their original priority. For example, if device 2 and device 3 are in their interim low priority state, they have a lower effective priority than all devices in the original priority state, however, the effective priority of device 3 is still higher than that of device 2. It should be appreciated that in the present embodiment, the device having the lowest original priority (e.g., device 5) remains in its original priority state since it already looses any arbitration with any of devices 1–4. However, this device is guaranteed access to the PCI bus due to the fact that as each of devices 1–4 are granted ownership, they become interim priority devices, such that, eventually, the device having the lowest original priority (e.g., device 5) will win an arbitration for ownership.

In this manner, arbitration process 300 ensures the lower priority devices are not starved of data transfer bandwidth. The interim low priority states of arbitration process 300 avoid the PCI bus monopolization problems encountered in prior art PCI bus arbitration process. Arbitration process 300 has no potential PCI agent starvation conditions due to the fact that, in accordance with the present invention, it gives each device a chance to obtain PCI bus ownership while simultaneously preventing high priority devices from monopolizing ownership.

In addition, arbitration process 300 offers the best latency performance for the most latency sensitive devices (e.g., device 0). For example, under worst case conditions (e.g., all devices simultaneously requesting PCI bus ownership) arbitration process 300 grants ownership to device 0 ½ of the time, device 1 ¼ of the time, device 2 ⅛ of the time, device 3 1/16 of the time, device 4 1/32 of the time, and device 5 1/64 of the time, etc. Hence, although the low priority devices may suffer from long bus latency during heavy loading periods, they are not shut out from access. If the low priority devices are not especially sensitive to latency, heavy loading periods are not an issue with arbitration process 300. If all devices (e.g., including low priority devices) are sensitive to latency, then arbitration process 300 can be modified to rotate the original priority of devices 0–5 to periodically redistribute allocation.

Figure 4:
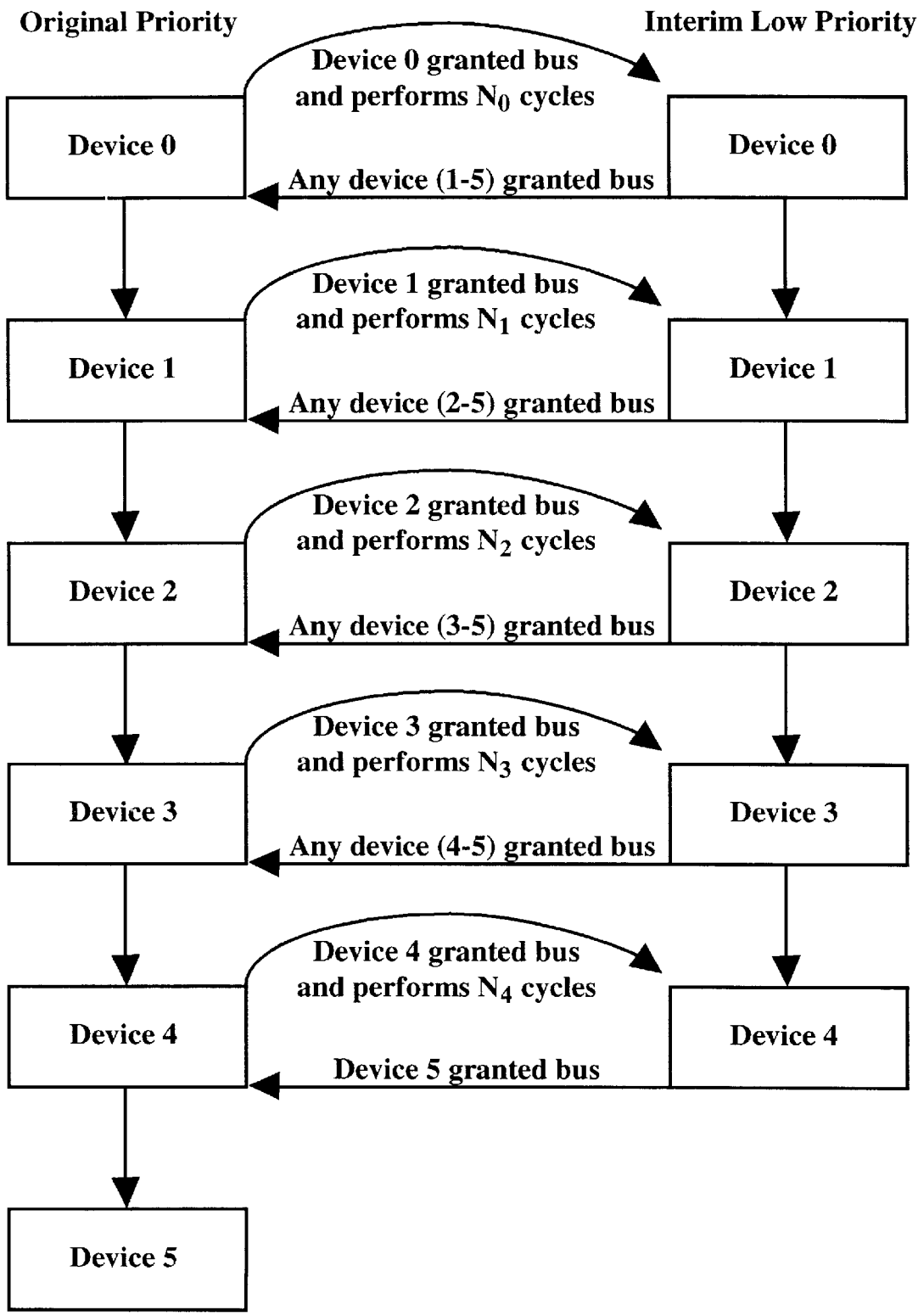
FIG. 4 shows a diagram of a second arbitration process in accordance with a more versatile alternative embodiment of the present invention.

Referring now to FIG. 4, an arbitration process 400 in accordance with a more versatile embodiment of the present invention is shown. Arbitration process 400 is similar to arbitration process 300, however, arbitration process 400 provides for a more granular, finer resolution of PCI bus bandwidth allocation and this allocation is programmable. With arbitration process 300, as described above, device 0 receives ownership 50% of the time, device 1 25% of the time, and so on, depending upon each device's original priority. In contrast, arbitration process 400 allows adjustable amounts of bandwidth allocation for each device by using a respective variable ownership allocation factor, $N_0$ through $N_4$, in addition to each device's original priority. Hence, arbitration process 400 provides for the adjustment of bus allocation beyond merely the priority position as in arbitration process 300. For example, using arbitration process 400, a system designer can allocate ownership to the highest priority device 66% of the time as opposed to 50%, or give the next highest priority device ownership 33% of the time while still giving the highest priority device ownership 50% of the time. In accordance with arbitration process 400 of the present invention, this is accomplished through modifying the allocation factors $N_0$ through $N_4$.

The allocation factors affect ownership allocation by affecting the conversion of devices from their original priority state to their interim low priority state. For example device 0, rather than converting to the interim low priority state after a single access, waits for a predetermined number of accesses before converting to the interim low priority state. This predetermined number corresponds to the allocation factor $N_0$, and is programmable. By programming $N_0$, a customized ownership allocation is obtained. An arbiter in accordance with the present invention will allow this number of accesses to occur before treating device 0 as an interim low priority device. As with arbitration process 300, device 0, (as with any devices 1–5) once in the interim low priority state, has the lowest effective priority of any of devices 1–5. Once a lower priority device is granted ownership (e.g., any of devices 1–5), device 0 reverts back to its original priority.

In this manner, programmable, high resolution PCI bus allocation is obtained. When one of devices 1–4 requests the PCI bus for the first time it is given its original priority. It retains this original priority for N more PCI cycles. Thereafter it converts to the interim low priority state where it is given the lowest priority until a lower priority device is granted the bus. After one of the lower priority devices is granted ownership, the interim low priority device reverts back to its original priority. Thus, arbitration process 400 avoids starvation of lower priority devices due to the fact that a high priority device is allocated ownership for a maximum of N PCI bus cycles (e.g., where a PCI bus cycle is defined as the period of time between the assertion of FRAME# to the deasserted of FRAME# and IRDY#), where N is programmable, before it converts to the interim low priority state and another device is granted ownership.

Hence, the amount of PCI bus bandwidth allocated to each device is calculated as follows:

1) For the highest priority device:
   PCI bus bandwidth=$N_o/(N_o+1)$;
   Where $N_o$ is programmable from 1 to TBD (TBD is whatever maximum limit is desired) and $N_o$ is specific to the highest priority device.

2) For lower priority devices:
   PCI bus bandwidth=$N_n/(N_n+1)$ * TBR;
   Where TBR is whatever the total bandwidth remaining after considering all higher priority devices. Again $N_n$ here is programmable from 1 to TBD, where TBD is whatever maximum limit is desired for each device. There is a different N for each device.

3) For the lowest priority device:
   PCI bus bandwidth=Whatever bandwidth is left over.

Thus, for example, if N is programmed to 1 for the highest priority device, 2 for the next higher priority device and 1 for each remaining device, where the total number of devices is 4, the PCI bus bandwidth allocation (for a heavily loaded bus) is as follows:

Device 0=>PCI bus bandwidth=½ (Therefore, there is ½ the PCI bus bandwidth remaining);
Device 1=>PCI bus bandwidth=⅔*½=²⁄₆=⅓ (Therefore there is ⅙ the bus remaining);
Device 2=>PCI bus bandwidth=½*⅙=¹⁄₁₂ (Therefore there is ¹⁄₁₂ the bus remaining);
Device 3=>PCI bus bandwidth=¹⁄₁₂.

Figure 5:
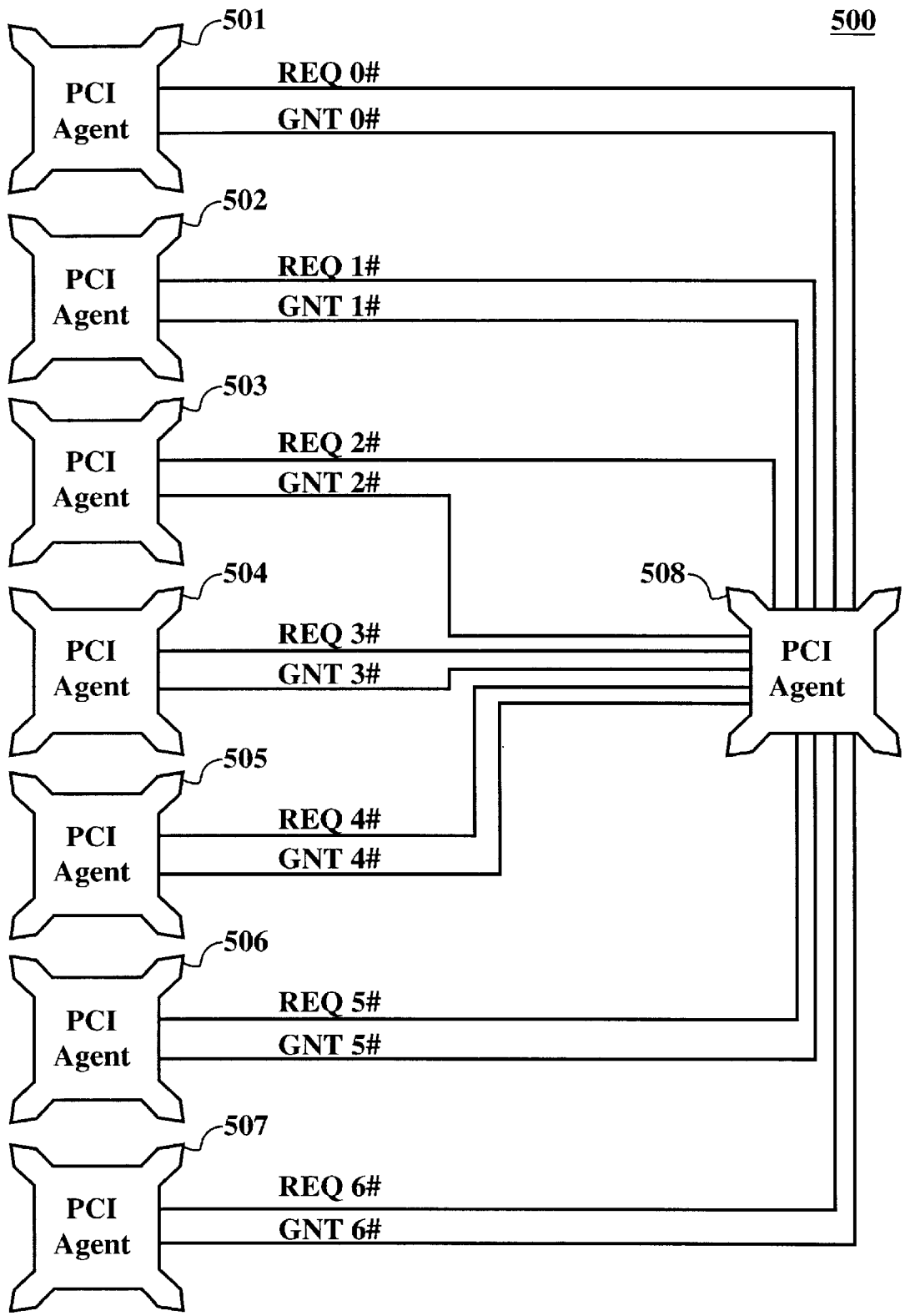
FIG. 5 shows a diagram of an arbitration system in accordance with one embodiment of the present invention.

Referring now to FIG. 5, a block diagram of an arbitration system 500 in accordance with one embodiment of the system of the present invention is shown. System 500 includes a plurality of PCI agents 501–507, each coupled via a respective request grant pair (e.g., REQ 0# GNT 0# through REQ 6# GNT 6#) to a PCI arbiter 508. Arbitration system 500, as described above, can implement arbitration process 300 or arbitration process 400. PCI arbiter 508 arbitrates among PCI agents 501–507 for PCI bus ownership. In the present embodiment, PCI agent 501 is the highest priority device (e.g., device 0) and PCI agent 507 is the lowest priority device (e.g., device 6).

Arbitration system 500, in accordance with the present invention, ensures the lower priority devices (e.g., PCI agent 507) are not starved of data transfer bandwidth. The interim low priority states of the present invention avoid PCI bus monopolization problems from high priority devices (e.g., PCI agent 501). Arbitration system 500 has no potential PCI agent starvation conditions due to the fact that, in accordance with the present invention, it gives each device a chance to obtain PCI bus ownership while simultaneously preventing high priority devices from monopolizing ownership.

Thus, the present invention provides a method and system of priority arbitration which provides predictable latency and guaranteed access for devices coupled to a bus. The present invention provides an arbitration process which is much more flexible with regard to allocating bus bandwidth. The present invention ensures low priority devices are not starved while ensuring high priority devices are adequately served. In so doing, the present invention efficiently allocates bus bandwidth to maximize the overall functionality of a computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A priority arbitration system for interfacing a plurality of peripheral component interconnect (PCI) agents coupled to a PCI bus such that high priority PCI agents are satisfied without starving low priority PCI agents, comprising:
   a PCI bus adapted to transmit data signals thereon;
   a high priority PCI agent coupled to said PCI bus;

a low priority PCI agent coupled to said PCI bus;

an arbiter coupled to said high priority PCI agent and said low priority PCI agent via said PCI bus;

said arbiter granting ownership of said PCI bus to said high priority PCI agent, said high priority PCI agent becoming an interim low priority PCI agent after a grant to said high priority PCI agent, said low priority PCI agent having a higher priority than said interim low priority PCI agent, said interim low priority PCI agent reverting to said high priority PCI agent subsequent to a grant to said low priority PCI agent, said arbiter granting ownership of said PCI bus to said low priority PCI agent before granting ownership of said PCI bus to said interim low priority PCI agent such that said low priority PCI agent is not prevented from accessing said PCI bus by said high priority PCI agent, and wherein said high priority PCI agent becomes said interim low priority PCI agent, said interim low priority PCI agent being the lowest priority of a plurality of PCI agents requesting ownership of said PCI bus.

2. The system of claim 1, wherein said arbiter grants ownership of said PCI bus to said high priority PCI agent, said high priority PCI agent being the highest priority of a plurality of PCI agents requesting ownership of said PCI bus.

3. The system of claim 1, wherein said high priority PCI agent becomes said interim low priority PCI agent subsequent to starting a data transaction via said PCI bus, said data transaction consequent from said grant to said high priority PCI agent from said arbiter.

4. The system of claim 1, wherein said low priority PCI agent has a higher priority than said interim low priority PCI agent such that said arbiter grants said PCI bus to said low priority PCI agent prior to said interim low priority PCI agent where said interim low priority PCI agent and said low priority PCI agent both are requesting ownership of said PCI bus.

5. The system of claim 1, wherein said interim low priority PCI agent reverts to said high priority PCI agent subsequent to said grant to said low priority PCI agent such that said high priority PCI agent again has a higher priority than said low priority PCI agent.

6. The system of claim 1, wherein a plurality of interim low priority PCI agents are prioritized with respect to each respective one of said plurality of interim low priority PCI agents.

7. A programmable priority arbitration system for interfacing a plurality of a peripheral component interconnect (PCI) agents coupled to a PCI bus such that high priority PCI agents are satisfied without starving low priority PCI agents, comprising:

a PCI bus adapted to transmit data signals thereon;

a high priority PCI agent coupled to said PCI bus;

a low priority PCI agent coupled to said PCI bus;

an arbiter coupled to said high priority PCI agent and said low priority PCI agent via said PCI bus;

said arbiter granting ownership of said PCI bus to said high priority PCI agent, said high priority PCI agent becoming an interim low priority PCI agent after a first number of transactions by said high priority PCI agent, said first number of transactions corresponding to a first allocation factor, said first allocation factor being programmable, said low priority PCI agent having a higher priority than said interim low priority PCI agent; and said interim low priority PCI agent reverting to said high priority PCI agent subsequent to a second number of transactions by said low priority PCI agent, said second number of transactions corresponding to a second allocation factor, said second allocation factor being programmable, said arbiter granting ownership of said PCI bus to said low priority PCI agent before granting ownership of said PCI bus to said interim low priority PCI agent such that said low priority PCI agent is not prevented from accessing said PCI bus by said high priority PCI agent, and wherein said high priority PCI agent becomes said interim low priority PCI agent, said interim low priority PCI agent being the lowest priority of a plurality of PCI agents requesting ownership of said PCI bus.

8. The system of claim 7, wherein said arbiter grants ownership of said PCI bus to said high priority PCI agent, said high priority PCI agent being the highest priority of a plurality of PCI agents requesting ownership of said PCI bus.

9. The system of claim 7, wherein a plurality of interim low priority PCI agents are prioritized with respect to each respective one of said plurality of interim low priority PCI agents.

10. The system of claim 7, wherein said high priority PCI agent becomes said interim low priority PCI agent subsequent to starting said first number of data transactions corresponding to said first allocation factor, said number of data transactions consequent from at least one grant from said arbiter.

11. The system of claim 7, wherein said low priority PCI agent has a higher priority than said interim low priority PCI agent such that said arbiter grants said PCI bus to said low priority PCI agent prior to said interim low priority PCI agent, wherein said interim low priority PCI agent and said low priority PCI agent are both requesting ownership of said PCI bus.

12. The system of claim 7, wherein said interim low priority PCI agent reverts to said high priority PCI agent subsequent to said second number of transactions by said low priority PCI agent such that said high priority PCI agent again has a higher priority than said low priority PCI agent.

13. The system of claim 7, wherein a first amount of bandwidth of said PCI bus is granted to said high priority PCI agent and a second amount of bandwidth of said PCI bus is granted to said low priority PCI agent, said first amount and said second amount corresponding to said first allocation factor and said second allocation factor, wherein said first and second allocation factors are programmable to ensure respective minimum access to said PCI bus.

14. In a priority arbitration system for interfacing a plurality of a peripheral component interconnect (PCI) agents coupled to a PCI bus, a process of allocating access to the PCI bus such that high priority PCI agents are satisfied without starving low priority PCI agents, the process comprising the steps of:

a) receiving a request for ownership of a PCI bus from a first PCI agent coupled to said PCI bus;

b) receiving a request for ownership of said PCI bus from a second PCI agent coupled to said PCI bus;

c) granting ownership of said PCI bus to said first PCI agent, wherein said first PCI agent is a higher priority than said second PCI agent;

d) converting said first PCI agent to an interim low priority PCI agent such that said second PCI agent is a higher priority;

e) granting ownership of said PCI bus to said second PCI agent such that said second PCI agent is not prevented from accessing said PCI bus by said first PCI agent;

f) reverting said first PCI agent to a high priority PCI agent subsequent to granting ownership to said second PCI agent; and g) converting said high priority PCI agent to said interim low priority PCI agent, said interim low priority PCI agent having the lowest priority of a plurality of PCI agents requesting ownership of said PCI bus.

15. The process of claim 14, further including the step of granting ownership of said PCI bus to said high priority PCI agent, said high priority PCI agent being the highest priority PCI agent out of a plurality of PCI agents requesting ownership of said PCI bus.

16. The process of claim 14 further including the step of prioritizing a plurality of interim low priority PCI agents with respect to each respective one of said plurality of interim low priority PCI agents.

17. The system of claim 14, further including the step of converting said high priority PCI agent to said interim low priority PCI agent subsequent to starting a data transaction via said PCI bus, said data transaction consequent from a grant to said high priority PCI agent from an arbiter.

18. The system of claim 14, further including the step of granting said PCI bus to said low priority PCI agent prior to said interim low priority PCI agent wherein said interim low priority PCI agent and said low priority PCI agent both are requesting ownership of said PCI bus.

* * * * *